F. E. HAGGMAN.
TIRE RETAINER.
APPLICATION FILED OCT. 31, 1921.
1,434,742.
Patented Nov. 7, 1922.
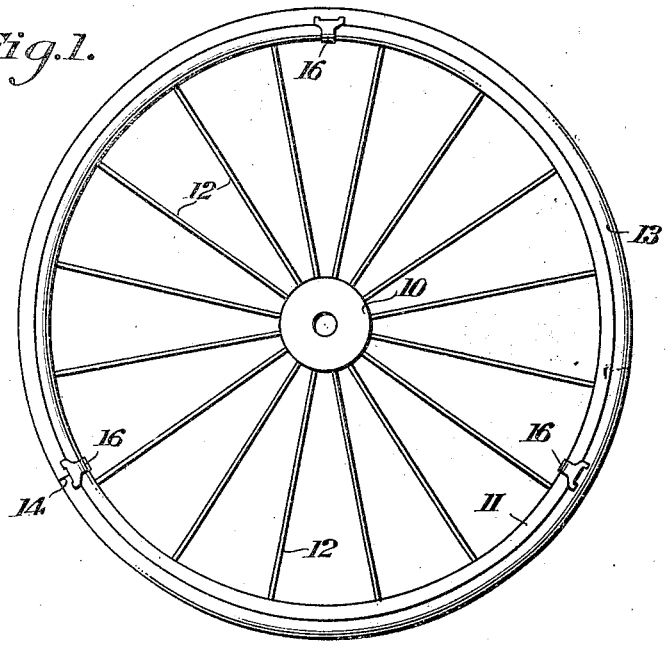
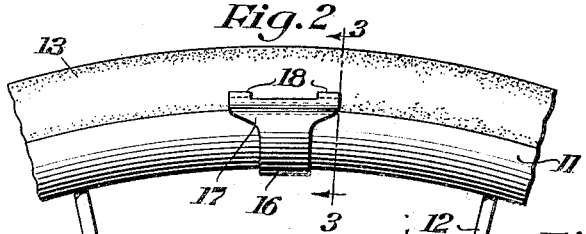
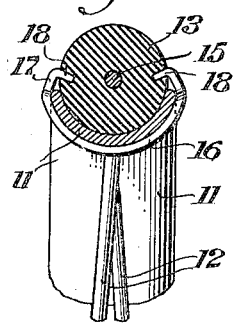
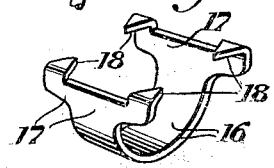
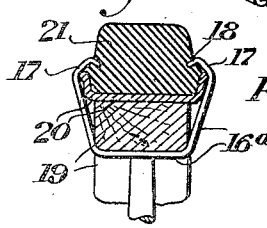
Inventor
Frank E. Haggman
his Attorneys Patented Nov. 7, 1922.

1,434,742

UNITED STATES PATENT OFFICE.

FRANK EDWARD HAGGMAN, OF NEW YORK, N. Y.

TIRE RETAINER.

Application filed October 31, 1921. Serial No. 511,644.

*To all whom it may concern:*

Be it known that I, FRANK EDWARD HAGGMAN, a citizen of the United States, and a resident of the borough of Bronx, in the county of Bronx, city and State of New York, have invented certain new and useful Improvements in Tire Retainers, of which the following is a specification.

This invention relates to improvements in tire retainers, and more particularly to retaining means for holding rubber or other cushion tires in place on the fellies or rims of wheels, such as baby carriage wheels, rolling chair wheels, wheels of horse-drawn and motor vehicles, and the like.

The invention has for one of its objects to provide simple, inexpensive and efficient means for holding a resilient tire in place on the rim or felly of a wheel without impairing the resilience of the tire. Another object of the invention is to provide a tire retainer which may be readily applied to commercial forms of wheels without the necessity of altering any part of the wheel or tire. A further object of the invention is to provide a retainer adapted for application to various types of wheels for holding various styles of cushion tires thereon.

To the foregoing and other ends, which will hereinafter appear, the invention consists in the features of construction and arrangements of parts set forth in the following description and particularly pointed out in the appended claims.

In the drawing:

Figure 1 is a side elevation of a well-known form of metal wheel for baby carriages and other light vehicles equipped with the improved tire-retaining devices;

Fig. 2 a fragmentary side elevation of the wheel shown in Fig. 1, on an enlarged scale;

Fig. 3 a transverse section on the line 3—3 of Fig. 2;

Fig. 4 a perspective view of one of the tire-retaining devices or clips shown in Figs. 1 to 3;

Fig. 5 a transverse sectional view showing a modified form of retaining device applied to a well-known form of wooden wheel for motor vehicles; and Fig. 6 a perspective view showing a form in which the retaining device may be sold for application to wheels of the types shown or to other styles of wheels.

Referring to the parts illustrated in Figs. 1 to 4, inclusive, by numerals, 10 designates the hub of a metal wheel for baby carriages and other light vehicles having a channel rim or felly 11 of arcuate form in transverse section connected with the hub by wire spokes 12. A solid rubber tire 13 is seated on the rim, said tire being divided as usual at 14 and provided with the usual wire 15 which extends entirely around the tire. One or more retaining devices are provided for preventing separation of the tire from the rim or felly of the wheel. I prefer to employ three retaining devices spaced equal distances apart around the rim, as shown in Fig. 1, but it will be obvious that any desired number of the retaining devices may be employed.

The retaining device illustrated in Figs. 1 to 4 comprises a relatively long, narrow, non-resilient sheet metal body portion 16 widened laterally at both ends, as shown at 17. This retaining device is made up for sale with the body portion thereof curved from end to end on the same arc as the inner surface of the rim 11, the transverse outer edge of each of the widened ends 17 of the body portion being formed with two integral inwardly bent prongs 18 extending in a horizontal plane over the concave side of the body portion 16. It will be understood, of course, that the retaining devices may be made up in various sizes and curved on various arcs to fit about fellies of various sizes and curvature. To apply the form of fastening device shown in Fig. 4 to the wheel, the concave side of the curved body portion 16 is fitted against the convex inner face of the rim 11 with the prongs 18 above the side edges of the rim and the widened ends 17 of the body portion are then bent inwardly toward each other to force the prongs 18 firmly into the body of the rubber tire 13. The retaining device and tire are thus securely interlocked with each other, the retaining device serving to hold the tire on the rim and being itself held against the inner face of the rim by its engagement with the tire.

In Fig. 5 a slightly modified form of retaining device, adapted for use on wooden motor vehicle wheels, is shown. In this construction the felly 19 of the wooden wheel is provided with the usual metal channel member 20 in which the usual rubber tire 21 is seated, and the body portion 16$^a$ of the retaining device is formed with a straight central portion adapted to engage under the felly 19 and outwardly flaring side portions which extend upwardly beyond the channel member 20. The body portion 16ª is widened at its ends at 17 and provided with inwardly extending prongs 18 in the same manner as the device shown in Fig. 4, which prongs are forced into tire 21 by bending the widened ends 17 inwardly toward each other.

Retaining devices of bendable, nonresilient, sheet metal for use on wheels such as the wheels shown in Figs. 3 and 5, or on wheels having fellies or rims of other forms, may be made and sold in the form illustrated in Fig. 6, wherein the entire body portion 16ᵇ, including the widened ends 17 thereof, is flat and is provided along its transverse end edges with integral laterally bent prongs 18. Devices so constructed may be made in various sizes, and may be applied to wheels having fellies or rims and tires of various shapes in transverse section by first bending the body portion 16ᵇ around the felly or rim and then bending the ends 17 inward toward each other to force the prongs 18 into the tire.

It will be obvious that the shape and size of the body portion of the device may be greatly varied and that the device may be provided with any desired number of prongs. When applied to transversely divided tires, such as shown in Fig. 1, one of the devices is preferably so located that prongs at each end thereof will engage in the tire at opposite sides of the line of division 14, said prongs thus serving to hold the ends of the divided tire together. It will also be obvious that devices constructed as described may be employed for retaining composition or other tires capable of being penetrated by the prongs, as well as rubber tires.

What I claim is:

1. A tire-retaining device having a relatively long and narrow body portion adapted to extend transversely under a wheel rim and formed with widened end portions each of which is provided with a plurality of tire-penetrating devices.

2. A tire-retaining device having a relatively long and narrow body portion adapted to extend transversely under a wheel rim and formed of bendable metal, said body portion being widened at its ends and each of said widened ends being provided with tire-penetrating prongs.

3. A tire-retaining device formed of a single strip of bendable sheet metal widened at opposite ends thereof, said metal strip being bent transversely into approximately U-shape and each widened end portion thereof being provided with a plurality of inwardly projecting tire-engaging prongs along its outer transverse edge.

4. The combination of a wheel having a channel rim, a cushion tire seated in said rim, and a sheet metal tire-retaining band embracing the rim and having its ends extending outwardly beyond the side edges of the rim and bent laterally toward the tire, said laterally bent ends of the retaining band being provided with prongs pressed into the tire.

In testimony whereof I hereunto affix my signature.

FRANK EDWARD HAGGMAN.